US010752382B2

United States Patent
Kessie et al.

(10) Patent No.: US 10,752,382 B2
(45) Date of Patent: *Aug. 25, 2020

(54) ENVIRONMENTAL IMPACT ASSESSMENT SYSTEM

(71) Applicant: General Electric Company, Schenectady, NY (US)

(72) Inventors: Andrew Scott Kessie, Springboro, OH (US); Rebecca Evelyn Hefner, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 34 days.

This patent is subject to a terminal disclaimer.

(21) Appl. No.: 16/131,457

(22) Filed: Sep. 14, 2018

(65) Prior Publication Data

US 2019/0016478 A1 Jan. 17, 2019

Related U.S. Application Data

(63) Continuation of application No. 15/183,833, filed on Jun. 16, 2016, now Pat. No. 10,099,804.

(51) Int. Cl.
*B64F 5/60* (2017.01)
*G06Q 10/06* (2012.01)
(Continued)

(52) U.S. Cl.
CPC ............... *B64F 5/60* (2017.01); *G06Q 10/06* (2013.01); *G07C 5/008* (2013.01); *G08G 5/0091* (2013.01); *B64F 5/00* (2013.01)

(58) Field of Classification Search
CPC .... G01C 21/367; G09B 29/003; G06T 17/00; G01S 17/89
See application file for complete search history.

(56) References Cited

U.S. PATENT DOCUMENTS 4,215,412 A 7/1980 Bernier et al.
4,528,844 A 7/1985 Couch
(Continued)

FOREIGN PATENT DOCUMENTS

CA 2516958 2/2006
EP 0253199 1/1988
(Continued)

OTHER PUBLICATIONS

PCT ISR Corresponding to PCT/US2017/36104 dated Aug. 1, 2017.
(Continued)

*Primary Examiner* — Rodney A Butler
(74) *Attorney, Agent, or Firm* — Wood IP LLC (57) ABSTRACT

Systems and methods for assessing and quantifying the environmental impact on a mechanical component are provided. In one embodiment, a method can include receiving one or more first set(s) of data from one or more first data acquisition system(s) configured to communicate with an onboard system of an aircraft. The method can further include receiving one or more second sets of data from one or more second data acquisition systems that are remote from the aircraft. The method can include determining an aggregate amount of the environmental condition experienced by a mechanical component of the aircraft based at least in part on the first sets of data and the second sets of data. The method can include predicting a level of distress associated with the mechanical component based at least in part on the aggregate amount of the environmental condition experienced by the mechanical component.

19 Claims, 6 Drawing Sheets

(51) Int. Cl.
*G07C 5/00* (2006.01)
*G08G 5/00* (2006.01)
*B64F 5/00* (2017.01)

(56) References Cited

U.S. PATENT DOCUMENTS

| | | | |
|---|---|---|---|
| 4,584,531 A | 4/1986 | Couch | |
| 4,625,280 A | 11/1986 | Couch | |
| 5,491,642 A | 2/1996 | Wormell et al. | |
| 5,602,543 A | 2/1997 | Prata et al. | |
| 6,013,921 A | 1/2000 | Moller et al. | |
| 6,312,191 B1 | 11/2001 | Rosenfeld | |
| 6,700,652 B2 | 3/2004 | Chao et al. | |
| 6,940,888 B2 | 9/2005 | Liu | |
| 7,328,128 B2 | 2/2008 | Bonanni et al. | |
| 7,340,967 B2 | 3/2008 | Zweifel | |
| 7,689,329 B2 | 3/2010 | Avery et al. | |
| 7,743,599 B2 | 6/2010 | Taware et al. | |
| 7,761,201 B2 | 7/2010 | Avery et al. | |
| 7,765,873 B2 | 8/2010 | Klosinski | |
| 7,853,433 B2 | 12/2010 | He et al. | |
| 7,861,544 B2 | 1/2011 | Ferreira et al. | |
| 7,984,146 B2 | 7/2011 | Rozak et al. | |
| 8,000,930 B2 | 8/2011 | Poncet et al. | |
| 8,256,277 B2 | 9/2012 | Khibnik et al. | |
| 8,262,780 B2 | 9/2012 | Smithies et al. | |
| 8,301,332 B2 | 10/2012 | Rawle | |
| 8,310,249 B2 | 11/2012 | Paterson | |
| 8,340,948 B1 | 12/2012 | Song et al. | |
| 8,349,045 B2 | 1/2013 | Jarrier | |
| 8,370,046 B2 | 2/2013 | Jiang et al. | |
| 8,424,279 B2 | 4/2013 | Rajamani et al. | |
| 8,452,475 B1 | 5/2013 | West et al. | |
| 8,459,103 B2 | 6/2013 | Khibnik et al. | |
| 8,471,730 B2 | 6/2013 | Tillotson | |
| 8,475,110 B2 | 7/2013 | Hefner et al. | |
| 8,594,866 B1 * | 11/2013 | Chen | B60L 3/00 701/21 |
| 8,594,903 B2 | 11/2013 | Feeney et al. | |
| 8,666,566 B2 | 3/2014 | Peyrucain et al. | |
| 8,692,982 B2 | 4/2014 | Yoshioka et al. | |
| 8,700,363 B2 | 4/2014 | Heinzerling | |
| 8,762,379 B2 | 6/2014 | Birdwell et al. | |
| 8,775,427 B2 | 7/2014 | Birdwell et al. | |
| 8,775,428 B2 | 7/2014 | Birdwell et al. | |
| 8,825,567 B2 | 9/2014 | Jiang et al. | |
| 9,010,198 B2 | 4/2015 | Rajamani et al. | |
| 9,079,670 B2 | 7/2015 | Woolley et al. | |
| 2004/0016445 A1 | 1/2004 | Koch et al. | |
| 2006/0075683 A1 | 4/2006 | Klein et al. | |
| 2008/0250769 A1 | 10/2008 | Wagner et al. | |
| 2009/0112519 A1 | 4/2009 | Novis et al. | |
| 2010/0266742 A1 | 10/2010 | Ferreira et al. | |
| 2011/0062973 A1 | 3/2011 | Paterson | |
| 2011/0179763 A1 | 7/2011 | Rajamani | |
| 2012/0068862 A1 | 3/2012 | Tillitson | |
| 2013/0011249 A1 | 1/2013 | Kippel et al. | |
| 2013/0025348 A1 | 1/2013 | Rajamani | |
| 2013/0042642 A1 | 2/2013 | Ferreira et al. | |
| 2013/0019978 A1 | 8/2013 | Woolley | |
| 2013/0193978 A1 | 8/2013 | Woolley et al. | |
| 2014/0008206 A1 | 1/2014 | Miller et al. | |
| 2014/0257760 A1 | 9/2014 | Nixon | |
| 2014/0278241 A1 | 9/2014 | Jiang et al. | |
| 2015/0076821 A1 | 3/2015 | Ekanayake et al. | |
| 2015/0081124 A1 | 3/2015 | Ekanayake et al. | |
| 2015/0101401 A1 | 4/2015 | Ekanayake et al. | |
| 2015/0106059 A1 | 4/2015 | Ekanayake et al. | |
| 2016/0195602 A1 * | 7/2016 | Meadow | G01S 5/0294 701/517 |
| 2017/0134087 A1 * | 5/2017 | Law | H04L 41/142 |

FOREIGN PATENT DOCUMENTS

| | | |
|---|---|---|
| EP | 1939801 | 7/2008 |
| EP | 1978222 | 10/2008 |
| EP | 2048508 | 4/2009 |
| EP | 2266880 | 12/2010 |
| EP | 2390742 | 11/2011 |
| EP | 2538199 | 12/2012 |
| EP | 2551660 | 1/2013 |
| EP | 2562701 A1 | 2/2013 |
| EP | 2801879 | 11/2014 |
| GB | 2482480 | 2/2012 |
| WO | WO2011/151462 | 12/2011 |
| WO | WO2012/009024 | 1/2012 |
| WO | WO2013/127993 | 9/2013 |
| WO | WO2013/191594 | 12/2013 |
| WO | WO2015/095890 | 6/2015 |
| WO | WO2015198213 A1 | 12/2015 |

OTHER PUBLICATIONS

MyFleet Plant Performance Monitoring Solution Empowers Plant Operators to Make Smarter Decisions; GE; Jun. 8, 2011; http://www.genewsroom.com/Press-Releases/MyFleet-Plant-Performance-Monitoring-Solution-Empowers-Plant-Operators-to-Make-Smarter-Decisions-219685.

Office Action for EP Patent Appl. No. 17731973.8, dated May 20, 2020, 5 pages.

* cited by examiner

ENVIRONMENTAL IMPACT ASSESSMENT SYSTEM

CROSS-REFERENCE TO RELATED APPLICATIONS

This application is a continuation application of U.S. Non-Provisional application Ser. No. 15/183,833, filed on Jun. 16, 2016, and which is hereby incorporated by reference in its entirety.

FIELD OF THE INVENTION

The present subject matter relates generally to determining the environmental impact on a mechanical component and more particularly to determining the environmental impact on a mechanical component using multiple environmental and component data sources.

BACKGROUND OF THE INVENTION

Machinery, such as turbine engines, and particularly gas or combustion turbine engines, are rotary engines that extract energy from a flow of combusted gases passing through the engine onto a multitude of turbine blades. Gas turbine engines have been used for land and nautical locomotion and power generation, as well as for aeronautical applications such as for aircrafts, including helicopters. In aircrafts, gas turbine engines are used for propulsion. In terrestrial applications, turbine engines are often used for power generation.

Everyday airborne Particles, such as dirt, dust, sand, volcanic ash, and other environmental contaminants can cause reduced operational time for machinery, such as turbine engines. This problem is further exacerbated in certain operating environments around the globe where machinery is exposed to significantly higher amounts of these airborne particles. Particles supplied to the component can clog, obstruct, infiltrate or coat the flow passages, protective coatings and surfaces of the components, which can reduce the efficiency, lower the lifespan and/or increase the maintenance cost of the machinery.

BRIEF DESCRIPTION OF THE INVENTION

Aspects and advantages of embodiments of the present disclosure will be set forth in part in the following description, or may be learned from the description, or may be learned through practice of the embodiments.

One example aspect of the present disclosure is directed to a computer-implemented method of determining environmental impact on a mechanical component. The method can include receiving, by one or more computing devices, one or more first sets of data from one or more first data acquisition systems configured to communicate with an onboard system of an aircraft. The first sets of data can be indicative of one or more parameters associated with the aircraft. The method can further include receiving, by the one or more computing devices, one or more second sets of data from one or more second data acquisition systems that are remote from the aircraft. The one or more second sets of data can be indicative of the environmental condition in one or more locations associated with the aircraft. The method can include estimating, by the one or more computing devices, an aggregate amount of the environmental condition experienced by a mechanical component of the aircraft based at least in part on the first sets of data and the second sets of data. The method can further include determining, by the one or more computing devices, a level of distress associated with the mechanical component based at least in part on the aggregate amount of the environmental condition experienced by the mechanical component.

Another example aspect of the present disclosure is directed to a system for determining environmental impact on a mechanical component. The system can include one or more processors and one or more memory devices. The one or more memory devices can store instructions that when executed by the one or more processors cause the one or more processors to perform operations. The operations can include receiving one or more first sets of data from one or more first data acquisition systems. The first sets of data can be indicative of one or more parameters associated with a mechanical component. The operations can further include receiving one or more second sets of data from one or more second data acquisition systems. The one or more second sets of data can be indicative of the environmental condition in one or more locations associated with the mechanical component. The operations can include estimating an aggregate amount of the environmental condition experienced by the mechanical component based at least in part on the first sets of data and the second sets of data. The operations can further include determining a level of hardware distress associated with the mechanical component based at least in part on the aggregate amount of the environmental condition experienced by the mechanical component.

Yet another example aspect of the present disclosure is directed to a system for managing a fleet of vehicles. The system can include one or more processors and one or more memory devices. The one or more memory devices can store instructions that when executed by the one or more processors cause the one or more processors to perform operations. The operations can include receiving one or more first sets of data from one or more first data acquisition systems associated with a vehicle of a plurality of vehicles. The first sets of data can be indicative of one or more parameters associated with a mechanical component associated with the vehicle. The operations can further include receiving one or more second sets of data from one or more second data acquisition systems. The one or more second sets of data can be indicative of the amount of an environmental condition in one or more locations in which the vehicle has traveled. The operations can include determining a level of distress associated with the mechanical component based at least in part on the first sets of data and the second sets of data. The operations can further include performing a predictive event associated with the mechanical component based at least in part on the level of distress associated with the mechanical component.

Other example aspects of the present disclosure are directed to systems, methods, aircrafts, avionics systems, devices, user interfaces, non-transitory computer-readable media for determining the environmental impact on mechanical components and managing a fleet of vehicles.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Reference now will be made in detail to embodiments of the present disclosure, one or more example(s) of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

Example aspects of the present disclosure are directed to determining the impact of environmental conditions on a mechanical component and managing a fleet of vehicles with regards to the same. As used herein, an environmental condition refers to conditions of an environment in which a mechanical component may operate. Environmental conditions can include, for example, one or more of dust, pollution, volcanic ash, sulfates, sea salt, carbon black, organic particulate, humidity, smoke, aerosols, etc. Mechanical components are those that are atmospherically exposed and/or that can degrade with exposure to the atmosphere. For example, a mechanical component can include an engine or any hardware in that engine.

In the systems and methods of the present disclosure, a ground-based computing system can receive multiple different data sets from a plurality of different sources to determine the hardware distress associated with a mechanical component. For example, sensors included with an aircraft engine can capture a first set of data indicating, at least a portion of, the amount of dust ingested by the engine. The sensors can send this data directly to the ground-based computing system or to an intermediate data acquisition system that can then send the data to the ground-based computing system. Additionally, the ground-based computing system can receive a second set of data from one or more other data acquisition system(s) that are remote from the aircraft (e.g., satellite systems, airport weather systems, etc.). The second set(s) of data can indicate the atmospheric dust levels in locations in which the aircraft has traveled. The ground-based computing system can analyze this data to determine an aggregate amount of dust that the engine has ingested and determine a hardware distress level of the engine. Additionally, the ground-based computing system can coordinate a fleet-maintenance operation (e.g., adjusting maintenance schedules, flight schedules, etc.) and/or perform a predictive event (e.g., recommend a hardware change) based on the determined distress levels.

More particularly, aspects of the present disclosure can include a central computing system and a plurality of data acquisition systems. For instance, one or more first data acquisition system(s) can be associated with an individual mechanical component. By way of example, the first data acquisition system(s) can be included on an aircraft and can communicate with various onboard systems of the aircraft to obtain one or more parameter(s). The parameter(s) can be indicative of at least a portion of the environmental condition (e.g., dust) experienced by the mechanical component (e.g., the aircraft engine). This can be obtained by one or more sensor(s) included with the mechanical component (e.g., the engine of the aircraft). Additionally, and/or alternatively, the one or more parameter(s) can include one or more airport code(s) of airports from which the aircraft has taken-off, flown near, and/or landed. Aircraft GPS position data can also be utilized to collect and connect respective environmental data.

One or more second data acquisition system(s) can be associated with a satellite based system, an airport based system, a publically available database, etc. The second data acquisition system(s) can collect, monitor, improve, enhance, scrub, filter, manage, obtain, etc. data associated with one or more environmental condition(s) in a plurality of locations. For example, the second data acquisition system can obtain data indicating the dust levels and several standard weather measurements at a plurality of airports through the world.

The computing system can obtain this data from the acquisition(s) systems. For instance, the computing system can obtain one or more first set(s) of data from the first data acquisition system(s) that can be indicative of the parameter(s) associated with the mechanical component (and/or the aircraft). The first set(s) of data can also include the airport code(s), as indicated above. The computing system can obtain one or more second set(s) of data from the second data acquisition system(s) that includes, for example, satellite data indicating the dust levels at various airports around the world.

The computing device(s) can quantify an aggregate amount of the environmental condition experienced by the mechanical component based, at least in part, on the first and second set(s) of data. For example, the parameter(s) of the first set(s) of data can indicate at least a portion of the level of dust ingested by an aircraft engine, such as, the amount ingested while in mid-flight. However, such information may not capture the total amount of dust ingested by the engine. For instance, the first set(s) of data may not indicate the level of dust ingested during take-off and landing.

To remedy this, the first set(s) of data can be supplemented by other environmental data (e.g., indicated in the second set(s) of data). For instance, the computing system can determine the aggregate amount of the environmental experienced by the mechanical component based, at least in part, on a correlation between one or more of the airport code(s) (e.g., indicated in the first set(s) of data) and one or more of the dust level(s) for the airport(s) (e.g., indicated in the second set(s) of data). By way of example, the computing systems can determine that an aircraft engine operated at the airport code "ATR" and that the dust level at the airport (e.g., Atar Airport) matching the airport code "ATR" was very high. Accordingly, the information provided by the first data acquisition system (e.g., obtained by the engine sensors) can be used in conjunction with the correlated location information to determine a more complete understanding of the aggregate amount of the dust or other particulate types experienced by the aircraft engine and its components.

The computing device(s) can use the determined aggregate amount of environmental condition to determine a level of hardware distress associated with the mechanical component. By way example, the level of hardware distress associated with an aircraft engine can be indicative of an amount of ingested dust or other particulate types for each flight over a life cycle of the engine. This can be determined based, at least in part, on whether a threshold amount of ingested particulate has been exceeded by the engine. As will be further described herein, in some implementations, this information can be further supplemented by data associated with the design, operation, maintenance, etc. of the mechanical component (e.g., engine).

The computing system can perform one or more action(s) based, at least in part, on the determined level of distress. For example, the computing system can generate an output for display on a user interface of a display device indicating the aggregate amount of ingested dust, the level of distress, distress thresholds, etc. to an interested user. Additionally, and/or alternatively, the computing system can perform an operation for vehicle fleet maintenance (e.g., adjusting maintenance schedules, operation schedules) and/or perform a predictive event (e.g., predict future maintenance levels, recommend a hardware change), as further described herein.

The systems and methods according to example aspects of the present disclosure provide a more comprehensive technique for determining the distress level associated with a mechanical component exposed to various environmental conditions. Moreover, the systems and methods provide techniques for managing a fleet of vehicles incorporating such components based, at least in part on, the determined distress levels. These approaches can provide characterize and quantify various environment factors on a global perspective to fully understand each mechanical component experience on a per use basis (e.g., flight-by-flight basis). In this way, the systems and methods according to example aspects of the present disclosure have a technical effect of better assessing component distress level, which can lead to increased operation time, better preventive maintenance, more accurately predicted service levels, and, ultimately, to safer operation.

Figure 1:
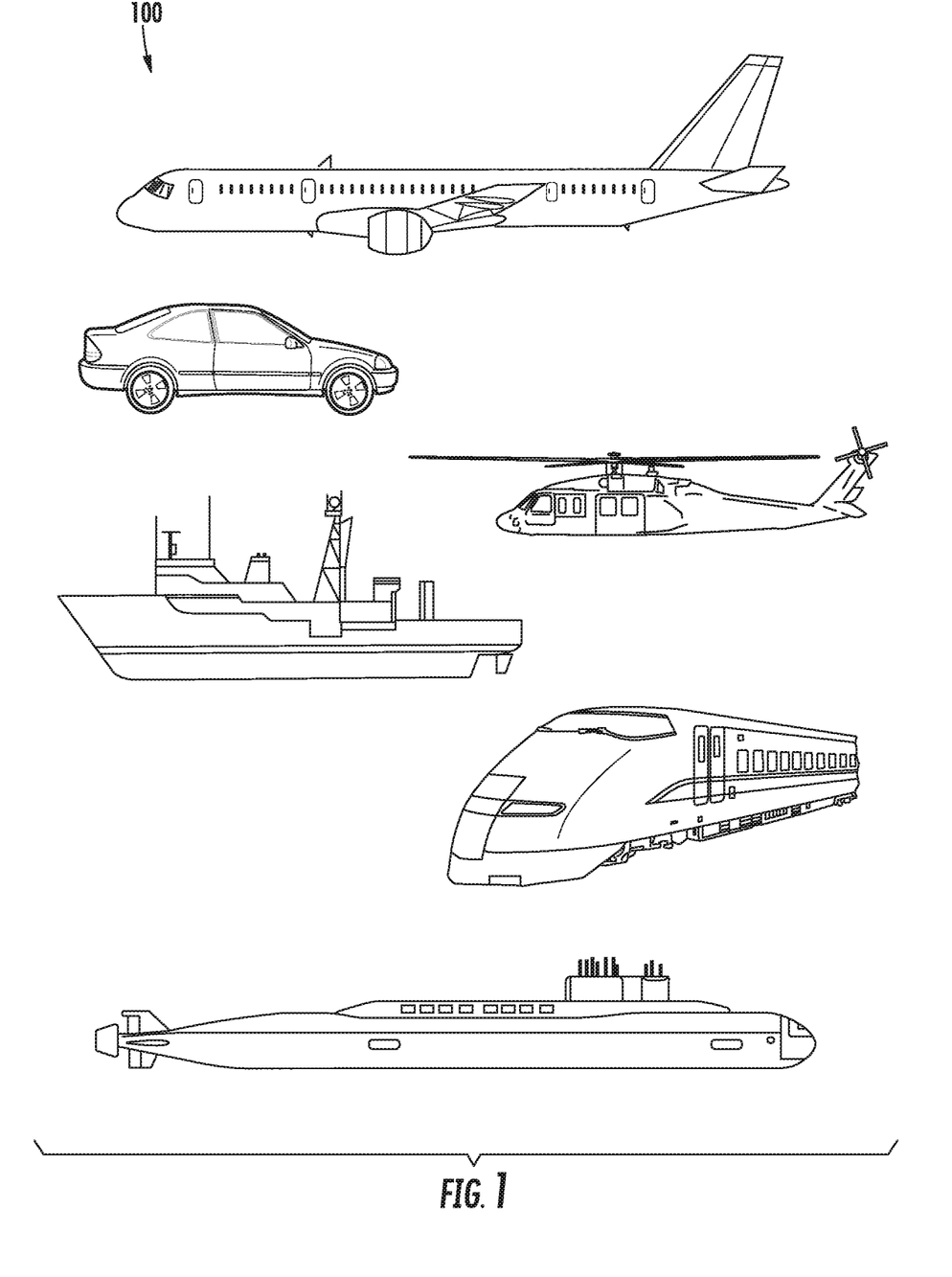
FIG. 1 depicts example vehicles according to example embodiments of the present disclosure.

With reference now to the FIGS., example embodiments of the present disclosure will be discussed in further detail. The systems and methods of the present disclosure can be implemented to determine the environment impact on any mechanical components that are atmospherically exposed and/or that can degrade with exposure to the atmosphere. For example, FIG. 1 depicts example vehicles 100 according example embodiments of the present disclosure. The systems and methods of the present disclosure can be implemented to determine the environment impact on one or more mechanical component(s) associated with an aircraft, helicopter, automobile, boat, submarine, train, and/or any other suitable vehicles. For instance, the systems and methods of the present disclosure can be implemented to determine the environment impact on an engine associated with one or more of the vehicle(s) 100.

While the present disclosure is described herein with reference to an aircraft implementation, this is intended only to serve as an example and not to be limiting. One of ordinary skill in the art would understand that the systems and methods of the present disclosure can be implemented on other vehicles without deviating from the scope of the present disclosure. In some implementations, the mechanical components referred to herein may not even be associated with a vehicle. For example, the systems and methods of the present disclosure can be implemented to determine the environment impact on mechanical components associated with residential applications, power generation applications, and/or healthcare applications.

Figure 2:
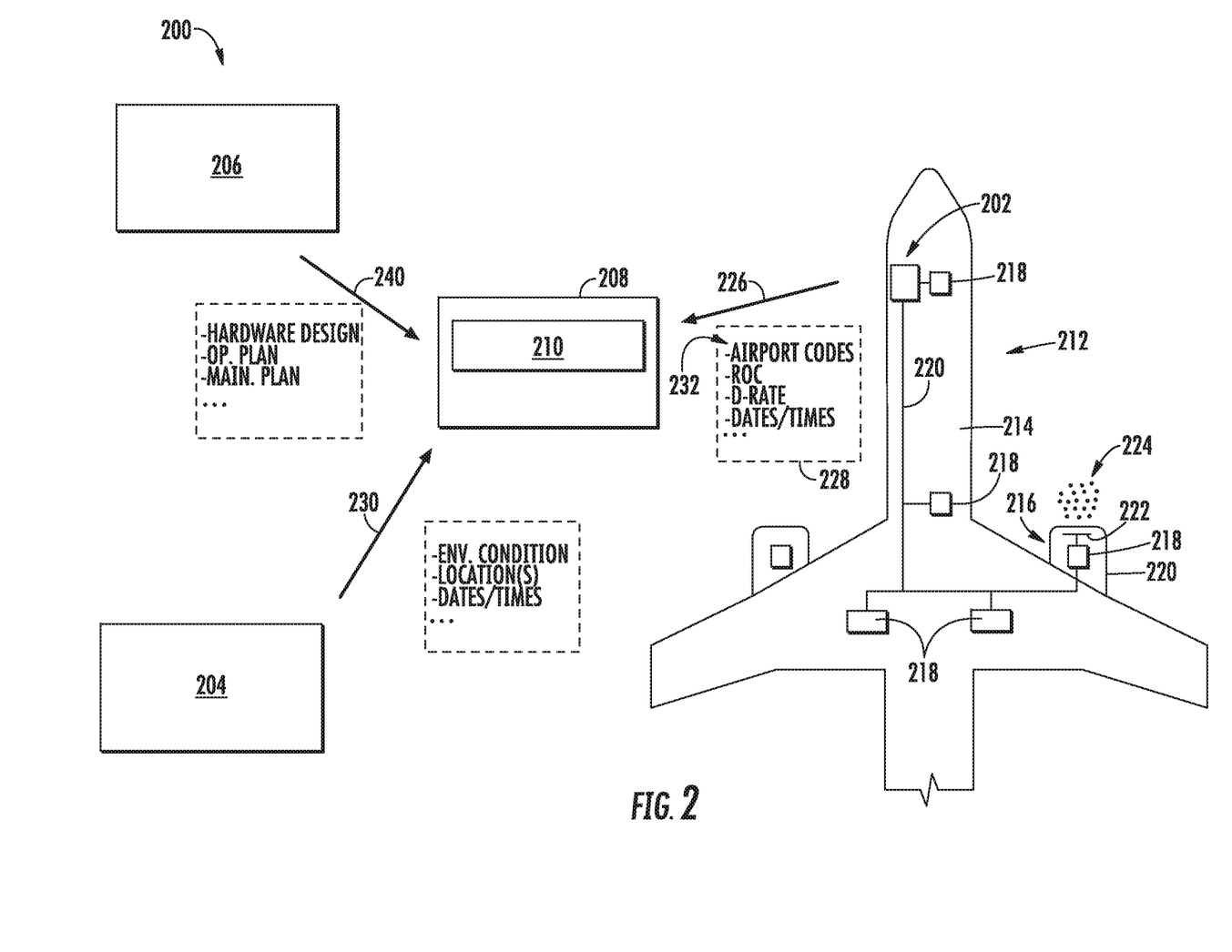
FIG. 2 depicts an example system according to example embodiments of the present disclosure.

FIG. 2 depicts an example system 200 according to example embodiments of the present disclosure. As shown, the system 200 can include one or more first data acquisition system(s) 202, one or more second data acquisition system(s) 204, one or more third data acquisition systems 206, and a computing system 208 (e.g., including computing device(s) 210). The data acquisition systems 202, 204, 206 can be configured to communicate with the computing system 208 (and/or one another) via one or more wired and/or wireless network(s). For example, the first data acquisition system(s) 202 can communicate with the computing system 208 by direct coupling of the systems via one or more wire(s) and/or via a suitable wireless network.

In some implementations, the first data acquisition system(s) 202 can be located on a vehicle 100, such as an aircraft 212. The aircraft 212 can include a fuselage 214, a mechanical component 216, and one or more onboard system(s) 218. As shown, the mechanical component 216 can be an engine 220 of the aircraft 212. The onboard system(s) 218 can be associated with various systems of the aircraft 212. The onboard system(s) 218 can be associated with communications systems, manual input systems, aircraft control systems, flight management systems, aircraft maintenance systems, a flight recorder, monitoring systems, and/or other systems of the aircraft 212. The onboard system(s) 218 can be configured to obtain a variety of information and parameter(s) associated with the mechanical component 216 and/or the aircraft 212. By way of example, the onboard system(s) 218 of the aircraft 212 can be associated with one or more sensor(s) 222 included with the mechanical component 216 (e.g., the engine 220 of the aircraft 212). The one or more sensor(s) 222 can be configured to measure at least a portion of an environmental condition 224 experienced by the engine 220. The environment condition 224 can be, for example, an amount of airborne dust. In some implementations, the environmental condition 224 can include dust particles.

Additionally, and/or alternatively, the parameter(s) can include other data associated with the vehicle 100 (e.g., the aircraft 212) and/or the mechanical component 216. This can include data indicating one or more environment(s) in which the vehicle 100 (e.g., the aircraft 212) has traveled, in which the mechanical component has operated, and/or in which it will do so. The onboard system(s) 218 can be configured to provide the parameter(s) to the first data acquisition system(s) 202, which can provide such data to the computing system 208.

The second data acquisition system(s) 204 can be associated with, for example, a satellite based system, an airport based system, a publically available database, etc. The second data acquisition system(s) 204 can collect, monitor, manage, obtain, etc. data associated with one or more environmental condition(s) in a plurality of locations. For example, the second data acquisition system 204 can obtain data associated with dust levels in a plurality of locations (e.g., airports) throughout the world. The second data acquisitions system(s) 204 can be configured to provide this data to one or more other systems, such as the computing system 208.

The third data acquisition system(s) 206 can be associated with an operator manufacturer, designer, maintainer, etc. of the mechanical component 216 and/or the vehicle 100. The third data acquisition system(s) 206 can obtain information associated with the design, operation, maintenance, etc. of the mechanical component 216 (and/or the vehicle 100). For instance, the third data acquisition system(s) 206 can obtain data associated with a hardware design associated with the mechanical component 216, an operation plan associated with the mechanical component 216 (e.g., a flight plan associated with the aircraft 212, a travel plan for a train), and/or a maintenance plan associated with the mechanical component 216. The third data acquisition system(s) 206 can provide such data to another system (e.g., the computing system 208) to further the determination of the environment impact on the mechanical component 216.

The computing system 208 can be associated with a ground-based system of a party interested in the health and maintenance of the mechanical component 216. The computing system 208 can include one or more computing device(s) 210. The computing device(s) 210 can include various components for performing various operations and functions. For example, and as further described herein, the computing device(s) 210 can include one or more processor(s) and one or more memory device(s). The one or more memory device(s) can store instructions that when executed by the one or more processor(s) cause the one or more processor(s) to perform the operations and functions as described herein.

For instance, the computing device(s) 210 can be configured to receive one or more first set(s) of data 226 from the one or more first data acquisition system(s) 202. The first set(s) of data 226 can be indicative of one or more parameter(s) 228 associated with the mechanical component 216 and/or the vehicle 100 (e.g., the aircraft 212). For example, the parameter(s) 228 can include data indicative of at least a portion of the environmental condition 224 experienced by the mechanical component 216, location information associated with environments in which the mechanical component 216 has and/or will operate (e.g., airport codes), temperature measurements, ambient temperature of the environments, engine thrust levels, rate of climb, decent rates, other health and maintenance information, dates/times associated with the parameter(s) 228, etc. The first set(s) of data 226 can be provided to the computing device(s) 210 via one or more wireless networks (e.g., when the aircraft 212 is in-flight) and/or via a standard data download (e.g., ACARS).

The computing device(s) 210 can be configured to receive one or more second set(s) of data 230 from the one or more second data acquisition system(s) 204. The second set(s) of data 230 can be indicative of the environmental condition 224 in one or more location(s) associated with the mechanical component 216. For example, the second set(s) of data 230 can indicate such data with respect to various locations around the world, as well as the date and time at which such data was obtained (e.g., when the level of environmental condition was measured). The second set(s) of data 230 can include satellite data associated with an environmental condition (e.g., aerosol optical thickness), data associated with amounts and/or levels of an environmental condition, data associated with a size of an environmental condition (e.g., pollution, dust, ash, sea salt), etc.

Figure 3:
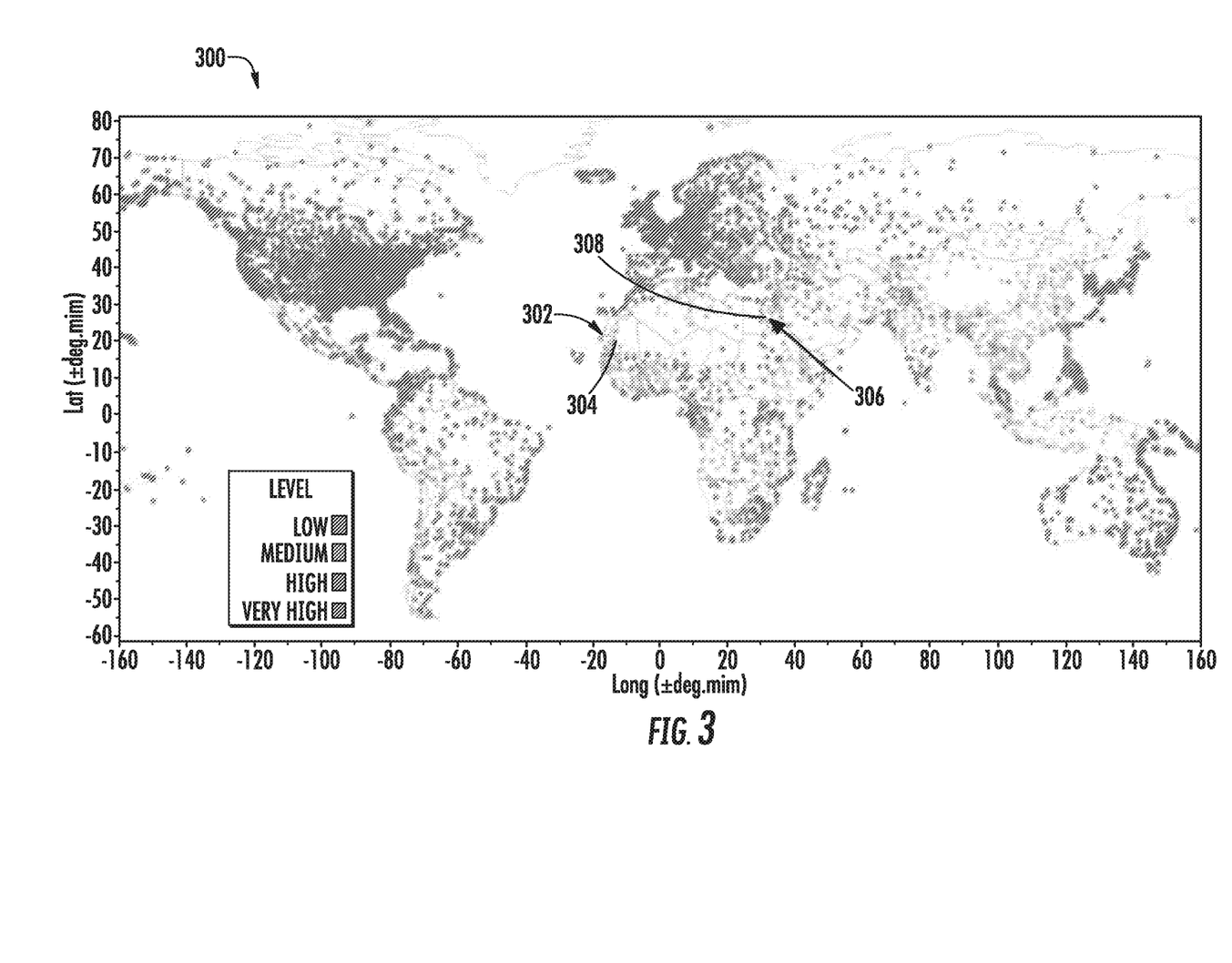
FIG. 3 depicts an example data according to example embodiments of the present disclosure.

FIG. 3 depicts example data 300 according to example embodiments of the present disclosure. The data 300 can be included in the second set(s) of data 230. The data 300 can include data that indicates various levels of the environmental condition 224 at various locations around the world. For instance, the data 300 can indicate a level of dust at particular locations and/or for a particular region. The locations can be identified by latitude and longitude pairs, place names, and/or other identifiers.

For example, the data 300 can indicate that the environmental condition 224 (e.g., dust,) is very high at a first location 302 (e.g., located in a dry region of Africa). In some implementations, the first location 302 can be associated with one or more first airport(s) 304 (e.g., Atar Airport in Mauritania). The data 300 can identify the level of the environmental condition 224 associated with the first airport(s) 304. The data 300 can also identify the latitude and longitude pair of the first airport(s) 304 (e.g., 20.4994° N, 13.0464° W), the name of the airport(s) 304 (e.g., Atar Airport), and/or the airport code of the first airport(s) 304 (e.g., ATR).

Additionally, and/or alternatively, the data 300 can indicate the level of the environmental condition 224 (e.g., dust) at a second location 306 (e.g., located in Egypt). In some implementations, the second location 306 can be associated with one or more second airport(s) 308 (e.g., Luxor International Airport in Egypt). The data 300 can identify the level of the environmental condition 224 associated with the second airport(s) 308. The data 300 can also identify the latitude and longitude pair of the second airport(s) 308 (e.g., 25.6702° N, 32.7040° E), the name of the second airport(s) 308 (e.g., Luxor International Airport), and/or the airport code of the second airport(s) 308 (e.g., LXR). The second set(s) of data 230 can be indicative of one or more dust level(s) for one or more environment(s) and/or airport(s) (e.g., 304, 308), in which the mechanical component 216 (e.g., engine 220) may have operated and/or will operate (e.g., by including the data 300).

Returning to FIG. 2, the computing device(s) 210 can be configured to determine an aggregate amount of the environmental condition 224 experienced by the mechanical component 216 based, at least in part, on the first set(s) of data 226 and the second set(s) of data 230. The aggregate amount can be an estimation. The computing device(s) 210 can process the data to use the parameter(s) 228 (e.g., indicated in the first set(s) of data 226) and the level of the environmental condition 224 in one or more location(s) (e.g., 302, 306) to estimate an aggregate amount of the environmental condition 224 experienced by the mechanical component 216.

The parameter(s) 228 can be indicative of at least a portion of the environmental condition 224 experienced by the mechanical component 216. By way of example, the parameter(s) 228 can provide a level of dust that is experienced by the mechanical component 216. This can be obtained by the one or more sensor(s) 222 included with the mechanical component 216 (e.g., the engine 220 of the aircraft 212). This information can be indicative of at least a portion of the environmental condition 224 experienced by the mechanical component 216 (e.g., while in mid-flight). In some implementations, however, such information may not accurately indicate the overall level of environmental condition 224 experienced by the mechanical component 216 (e.g., also during take-off and landing).

To help obtain a full understanding of the entire level of environmental condition 224 experienced by the mechanical component 216, the first set(s) of data 226 can be further supplemented by other environmental data (e.g., indicated in the second set(s) of data 230). For instance, the one or more parameter(s) 228 can include one or more airport code(s) 232. The airport code(s) 232 can indicate the airport(s) from which the aircraft 212 has taken-off, the airport(s) near which the aircraft 212 has operated, the airport(s) near which the aircraft 212 has landed, etc. Thus, the airport code(s) 232 can be indicative of the environments/airport(s) near which the mechanical component 216 has operated. The second set(s) of data 230 can be indicative of one or more environmental condition level(s) for one or more airport(s) 304, 308.

The computing device(s) 210 can determine the aggregate amount of the environmental condition 224 (e.g., dust) experienced by the mechanical component 216 based, at least in part, on a correlation between one or more of the airport code(s) and one or more of the dust level(s) for one or more of the airport(s) 304, 308. For example, the computing device(s) 210 can determine that the mechanical component 216 (e.g., engine 220) operated at the airport code 232 (e.g., ATR) and that the dust level at airport 302 (e.g., Atar Airport) matching the airport code 232 (e.g., ATR) was very high. Thus, the computing device(s) 210 can also determine that the mechanical component 210 experienced this level of environmental condition 224 (e.g., dust). Accordingly, the information provided by the first data acquisition system(s) 202 (e.g., obtained by the engine sensors) can be used in conjunction with the correlated location information (e.g., combination of the first and second sets of data) to determine a more complete understanding of the aggregate amount of the environmental condition 224 experienced by the mechanical component 216.

The computing device(s) 210 can be configured to determine a level of hardware distress associated with the mechanical component 216 based, at least in part, on the aggregate amount of the environmental condition 224 experienced by the mechanical component 216. For instance, the level of hardware distress associated with the mechanical component 216 can be indicative of an amount of ingested dust and/or other particulate types for each use-period (e.g., flight, operation time, on-time, run cycle) over a life cycle of the mechanical component 216 (e.g., engine 220).

In some implementations, the computing device(s) 210 can be configured to determine the level of distress by determining a number of times the mechanical component 216 exceeds a threshold level of environmental condition 224. The threshold can indicate a level, amount, volume, etc. of the environmental condition 224 (e.g., dust) that can be experienced by a mechanical component 216 (e.g., ingested by an engine 220) before a recommended maintenance procedure (e.g., water wash, part replacement, partial rebuild) should be performed. The level of distress can indicate whether the mechanical component 216 has experienced the environmental condition 224 beyond this threshold and/or how often the mechanical component 216 has exceeded the threshold.

In some implementations, the computing device(s) 210 can be configured to determine the level of distress based, at least in part, on information provided by the third data acquisition system(s) 206. For instance, the computing device(s) 210 can be configured to receive one or more third set(s) of data 240 from the one or more third data acquisition system(s) 206. The one or more third set(s) of data 240 can be indicative of at least one of a hardware design associated with the mechanical component 216, an operation plan associated with the mechanical component 216, and/or a maintenance plan associated with the mechanical component 216. This data can be indicative of, for example, one or more material(s) of the mechanical component 216, its maintenance history (e.g., how maintained, number of maintenance checks, how often overhauled), scheduled maintenance, etc. This data can be historical, near real-time, and/or predictive. In some implementations, the third set(s) of data 240 can be indicative of one or more upcoming event(s) associated with an environmental condition (e.g., dust storms, wild fires). The computing device(s) 210 can be further configured to determine the level of hardware distress (associated with the mechanical component 216) based, at least in part, on the third set(s) of data 240.

Figure 4:
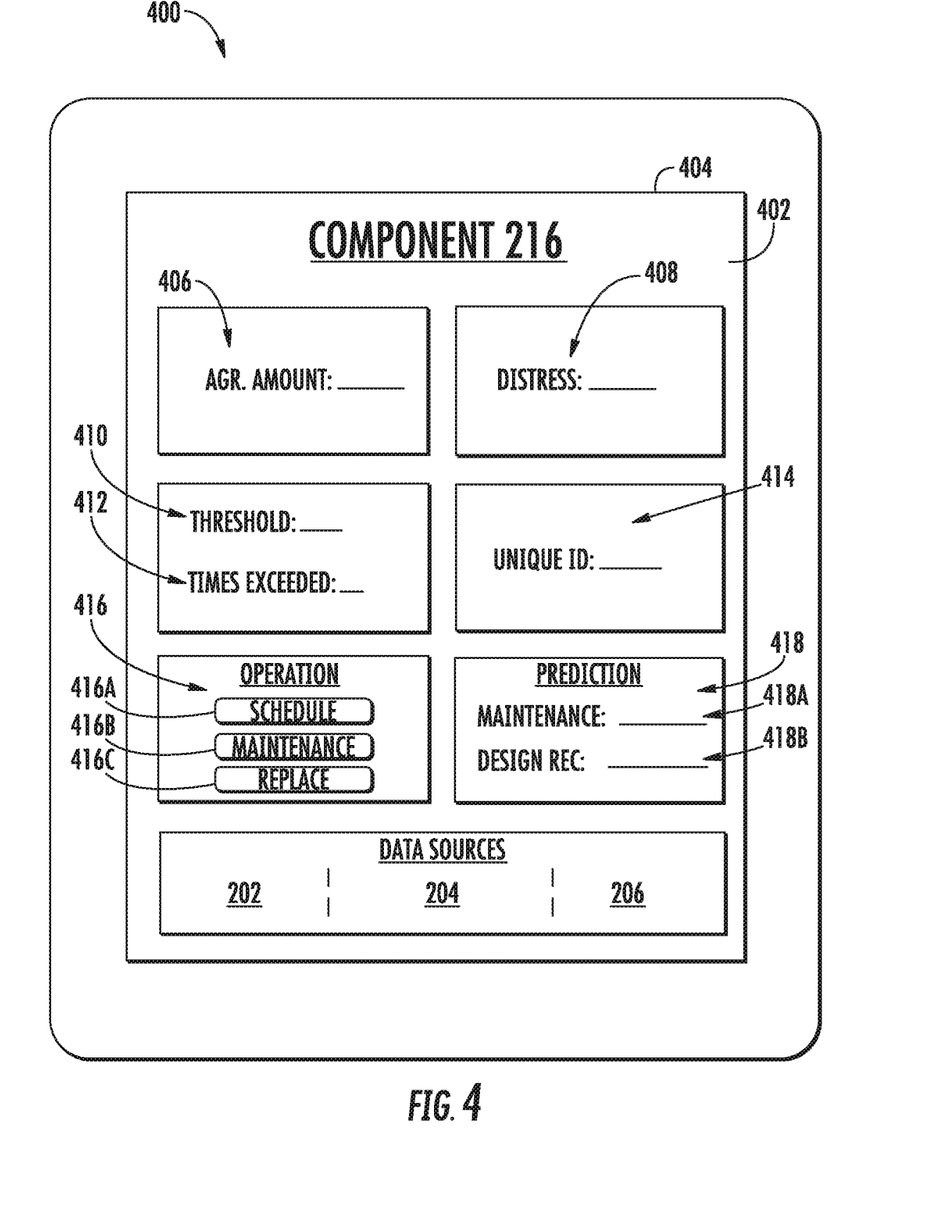
FIG. 4 depicts an example display device according to example embodiments of the present disclosure.

The computing device(s) 210 can be configured to generate an output indicative of the aggregate amount of the environmental condition 224, the level of distress, and/or other information associated with the mechanical component 216. For example, FIG. 4 depicts an example display device 400 according to example embodiments of the present disclosure. The computing device(s) 210 can generate an output 402 indicative of the aggregate amount of the environmental condition 224, the level of distress, and/or other information associated with the mechanical component 216. The computing device(s) 210 can be configured to provide for display the output 402 on a user interface 404 of the display device 400.

The display device 400 can receive the output 402 and display the output 402 on the user interface 404. For example, the output 402 can be indicative of at least one of the aggregate amount 406 of the environmental condition 224, a level of distress 408 associated with the mechanical component 216, a threshold level 410 of the environmental condition 224, a number of times 412 the mechanical component 216 exceeds the threshold level 410 of the environmental condition 224, etc.

In some implementations, the computing device(s) 210 can be configured to generate a unique identifier 414 indicative of the aggregate amount 406 of the environmental condition 224 experienced by the mechanical component 216 and/or the level of distress 408 associated with the mechanical component 216. In some implementations, the unique identifier 414 can be component-specific. For example, certain environmental conditions (e.g., dust, ash, sea salt, pollution) can have different mineral fractions and specific mineral ratios. Certain mechanical components can be more affected by certain mineral fractions and/or ratios (e.g., faster degradation). The unique identifier 414 can indicate different environmental condition, different mineral ratios, etc. that are particularly relevant for a particular mechanical component 216 (e.g., engine 220). The unique identifier 414 can be used, for example, within other data analysis associated with the mechanical component 216.

In some implementations, one or more items of information indicated in the user interface 404 can include one or more interactive elements (e.g., hyperlinks, soft buttons) with which a user can interact to access and/or view additional information associated therewith (e.g., via another user interface loaded on the display device 400 upon interaction with the interactive element). For example, by clicking on a hyperlink associated with a level of distress 408, the user can view additional component-specific information.

Additionally, and/or alternatively, the user interface 404 can provide one or more interactive element(s) 416 by which a user can order an operation 416 for the computing device(s) 210 to perform. For example, the operation 416 can include adjusting a schedule (e.g., 416A) associated with the mechanical component 216 (e.g., a flight schedule of the aircraft 212), coordinating maintenance (e.g., 416B) of the mechanical component 216, ordering replacement component(s) (e.g., 416C) for the mechanical component 216, etc. The display device 400 can send a set of data (not shown) to the computing device(s) 210 indicting the operation 416 and the computing device(s) 210 can perform the operation 416.

Additionally, and/or alternatively, the user interface 404 can indicate a predictive event 418 performed by the computing device(s) 210. For instance, the computing device(s) 210 can perform a predictive event 418 associated with the mechanical component 216 based, at least in part, on the level of distress 408 associated with the mechanical component 216 (e.g., of the aircraft 212). For instance, the computing device(s) 210 can be configured to predict an amount of maintenance 418A for one or more other component(s) that are similar to the mechanical component 216. By way of example, the computing device(s) 210 can predict the amount of maintenance that may be required by an engine (e.g., over its life time) that is similar to the engine 220. This can help to determine the potential service requirements for such engines. Additionally, and/or alternatively, the computing device(s) 210 can be configured to generate a recommendation 418B indicating a hardware change associated with the mechanical component 216 and/or a future design change of the component. For example, based, at least in part, on the level of distress 208 associated with the engine 220 (e.g., of aircraft 212), the computing device(s) 210 can recommend a design change for a future generation of the engine 220. The design change can aim to address and/or reduce potential levels of distress associated with the environmental condition 224 (e.g., dust).

In some implementations, the computing system 202 can be configured to manage a fleet of vehicles 100 (e.g., aircrafts 212) based, at least in part, on the level of distress caused by an environmental condition 224. For example, the computing device(s) 210 can be configured to receive one or more first set(s) of data 226 from the one or more first data acquisition system(s) 202 associated with a vehicle 100 (e.g., aircraft 212) of a plurality of vehicles (e.g., aircrafts). The first set(s) of data 226 can be indicative of one or more parameter(s) associated with a mechanical component 216 (e.g., associated with the vehicle 100). The computing device(s) 210 can be configured to receive one or more second set(s) of data 230 from the one or more second data acquisition system(s) 204. The one or more second set(s) of data 230 can be indicative of the amount of dust and/or other particulate types in one or more location(s) (e.g., 302) in which the vehicle 100 has traveled. The computing device(s) 210 can be configured to determine a level of distress 408 associated with the mechanical component 216 based, at least in part, on the first set(s) of data 226 and the second set(s) of data 230. The computing device(s) 210 can be configured to perform a predictive event 418 (as described herein) associated with the mechanical component 216 based, at least in part, on the level of distress 408 associated with the mechanical component 216. Additionally, and/or alternatively, the computing device(s) 210 can be configured to perform an operation 416 associated with a vehicle fleet that includes the vehicle 100 (e.g., schedule adjustment, maintenance coordination, replacement order).

Figure 5:
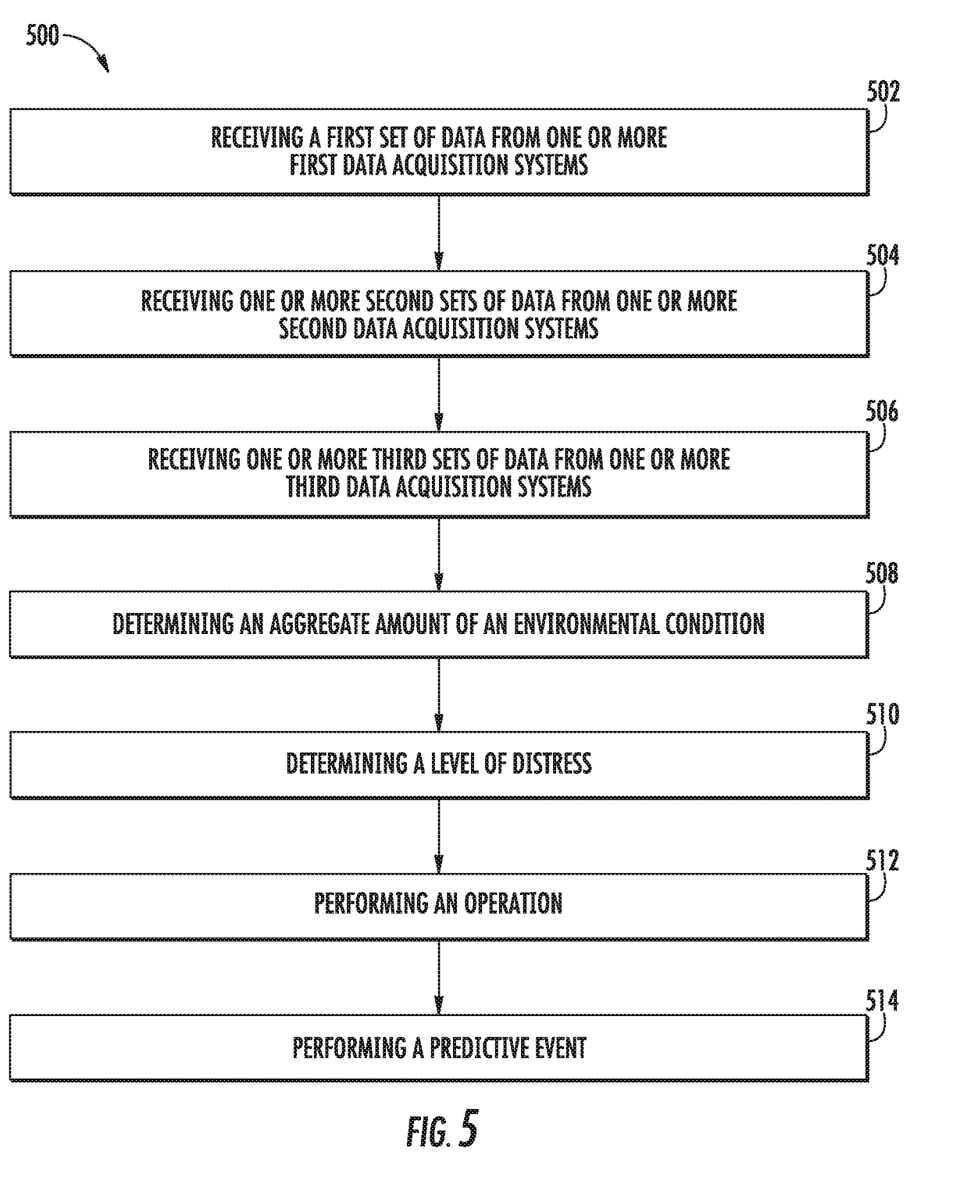
FIG. 5 depicts a flow diagram of an example method for determining environmental impact on a mechanical component according to example embodiments of the present disclosure.

FIG. 5 depicts a flow diagram of example method 500 of determining environmental impact on a mechanical component according to example embodiments of the present disclosure. FIG. 5 can be implemented by one or more computing device(s), such as the computing device(s) 210 depicted in FIGS. 1 and 6. One or more step(s) of the method 500 can be performed while a mechanical component (and/or a vehicle associated therewith) is in operation. In addition, FIG. 5 depicts steps performed in a particular order for purposes of illustration and discussion. Those of ordinary skill in the art, using the disclosures provided herein, will understand that the various steps of any of the methods disclosed herein can be modified, adapted, expanded, rearranged and/or omitted in various ways without deviating from the scope of the present disclosure.

At (502), the method 500 can include receiving one or more first set(s) of data from one or more first data acquisition system(s). For instance, the computing device(s) 210 can receive one or more first set(s) of data 226 from the one or more first data acquisition system(s) 202 configured to communicate with one or more onboard system(s) 218 of a vehicle 100 (e.g., the aircraft 212). In some implementations, the one or more computing device(s) 210 can be associated with a ground-based computing system, and/or the one or more first data acquisition system(s) 202 can be located on the vehicle 100 (e.g., the aircraft 212).

The first set(s) of data 226 can be indicative of one or more parameter(s) 228 associated with the vehicle 100 (e.g., the aircraft 212) and/or the mechanical component 216. By way of example, the mechanical component 216 can be an engine 220 (e.g., of the vehicle 100, the aircraft 212) and the onboard system(s) 218 (e.g., of the vehicle 100, the aircraft 212) can be associated with one or more sensor(s) 222 included with the engine 220 (e.g., of the vehicle 100, the aircraft 212). The one or more sensor(s) 222 can be configured to measure at least a portion of the environmental condition 224 (e.g., dust) experienced by the engine 220. The parameter(s) 228 can indicate at least a portion of the level of environmental condition 224 experienced by the engine 220 (e.g., the level while in mid-fight). Additionally, and/or alternatively, the one or more parameter(s) 228 can include one or more airport code(s) 232, as described above.

At (504), the method 500 can include receiving one or more second set(s) of data from one or more second data acquisition system(s). For instance, the computing device(s) 210 can receive one or more second set(s) of data 230 from the one or more second data acquisition system(s) 204 (e.g., that are remote from the aircraft 212).

The one or more second set(s) of data 230 can be indicative of the environmental condition 224 in one or more location(s) 302, 304 associated with the vehicle 100 (e.g., aircraft 212). The one or more locations can be associated with one or more airport(s). For example, as described herein, the second set(s) of data 230 can be indicative of one or more dust level(s) for one or more airport(s) 304, 308. In some implementations, one or more location(s) 302, 304 (e.g., associated with the aircraft 212) can include at least one of a first environment (e.g., near the first airport 304) in which the vehicle 100 (e.g., the aircraft 212) has traveled and/or a second environment (e.g., near the second airport 308) in which the vehicle 100 (e.g., the aircraft 212) will travel and/or plans to travel.

At (506), the method 500 can include receiving one or more third set(s) of data from one or more third data acquisition system(s). For instance, the computing device(s) 210 can receive one or more third set(s) of data 240 from one or more third data acquisition system(s) 206. The one or more third set(s) of data 240 can be indicative of at least one of a hardware design associated with the mechanical component 216, an operation plan, and/or a maintenance plan associated with the mechanical component 216, as further described herein.

At (508), the method 500 can include estimating an aggregate amount of an environment condition experienced by a mechanical component. For instance, the computing device(s) 210 can estimate an aggregate amount 406 of the environmental condition 224 (e.g., dust, ash, sea salt) experienced by a mechanical component 216 (e.g., of the aircraft) based, at least in part, on the one or more first set(s) of data 226 and/or the second set(s) of data 230. For example, as further described herein, at least a portion of such determination can include estimating the aggregate amount 406 of the environmental condition 224 experienced by the mechanical component 216 based, at least in part, on a correlation between one or more of the airport code(s) 232 (e.g., indicated in the first set(s) of data 226) and one or more of the dust level(s) for one or more of the airport(s) 304, 308 (e.g., indicated in the second set(s) of data 230).

At (510), the method 500 can include determining a level of distress associated with a mechanical component. For example, the computing device(s) 210 can determine a level of distress 408 associated with the mechanical component 216 based, at least in part, on the aggregate amount 406 of the environmental condition 224 experienced by the mechanical component 216. In some implementations, the computing device(s) 210 can determine the level of distress 408 associated with the mechanical component 216 based, at least in part, on the third set(s) of data 230.

The level of distress 408 can be indicative of the level of environmental impact on the mechanical component 216 due to exposure to the environmental condition 224. By way of example, the level of distress 408 associated with the mechanical component 216 can be indicative of an amount of ingested dust for each use (e.g., flight) over a life cycle of the mechanical component 216 (e.g., the engine 220). In some implementations, as described herein, determining the level of distress 408 associated with the mechanical component 216 can include determining (e.g., by the computing devices 210) if the mechanical component 216 exceeds a threshold level 410 of the environmental condition 224 and/or a number of times 412 the mechanical component 216 exceeds the threshold level 410 of the environmental condition 224.

At (512), the method 500 can include performing an operation and/or, at (514), the method 500 can include performing a predictive event. The computing device(s) 210 can perform an operation 416 and/or a predictive event 418, as further described herein. For example, the computing device(s) 210 can perform an operation 416 associated with a vehicle fleet that includes the vehicle 100 (e.g., the aircraft 212). The operation 416 can include at least one of adjusting a schedule associated with the fleet, coordinating maintenance of the fleet, and/or ordering one or more replacement component(s) for the fleet. The predictive event 418 can include predicting an amount of maintenance for a component similar to the mechanical component 216, generating a recommendation about a hardware change, and/or other predictive actions associated with the mechanical component 216 and/or its corresponding vehicle 100.

Figure 6:
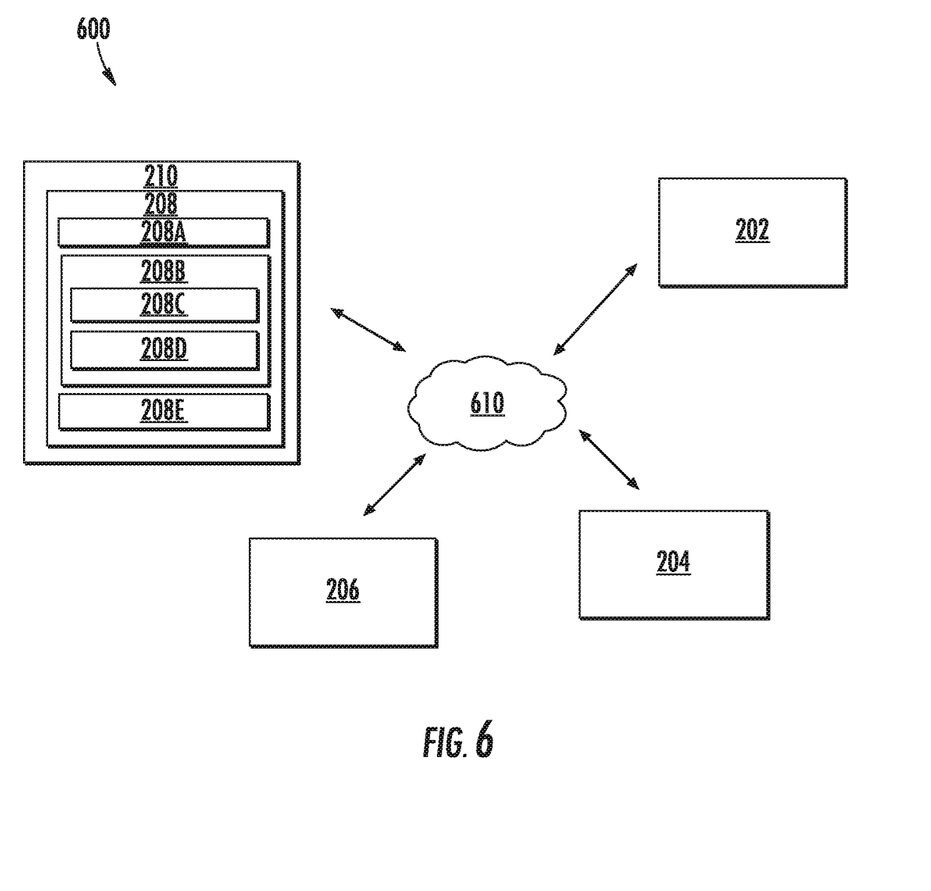
FIG. 6 depicts an example system according to example embodiments of the present disclosure.

FIG. 6 depicts an example system 600 according to example embodiments of the present disclosure. The system 600 can include the first, second, and third data acquisition system(s) 202, 204, 206, as well as the computing system 208. The first, second, and third data acquisition system(s) 202, 204, 206, and/or the computing system 208 can be configured to communicate via more or more network(s) 610, which can include any suitable wired and/or wireless communication links for transmission of the communications and/or data, as described herein. For instance, the network 610 can include a SATCOM network, ACARS network, ARINC network, SITA network, AVICOM network, a VHF network, a HF network, a Wi-Fi network, a WiMAX network, a gatelink network, etc.

The computing system 208 can include one or more computing device(s) 210. The computing device(s) 210 can include one or more processor(s) 210A and one or more memory device(s) 210B. The one or more processor(s) 210A can include any suitable processing device, such as a microprocessor, microcontroller, integrated circuit, logic device, and/or other suitable processing device. The one or more memory device(s) 210B can include one or more computer-readable media, including, but not limited to, non-transitory computer-readable media, RAM, ROM, hard drives, flash drives, and/or other memory devices.

The one or more memory device(s) 210B can store information accessible by the one or more processor(s) 210A, including computer-readable instructions 210C that can be executed by the one or more processor(s) 210A. The instructions 210C can be any set of instructions that when executed by the one or more processor(s) 210A, cause the one or more processor(s) 210A to perform operations. In some embodiments, the instructions 210C can be executed by the one or more processor(s) 210A to cause the one or more processor(s) 210A to perform operations, such as any of the operations and functions for which the computing system 208 and/or the computing device(s) 210 are configured, the operations for determining environmental impact on mechanical component (e.g., method 500), as described herein, the operations for managing a fleet of vehicles (e.g., aircrafts), and/or any other operations or functions of the one or more computing device(s) 210. The instructions 210C can be software written in any suitable programming language or can be implemented in hardware. Additionally, and/or alternatively, the instructions 210C can be executed in logically and/or virtually separate threads on processor(s) 210A. The memory device(s) 210B can further store data 210D that can be accessed by the processor(s) 210A. For example, the data 210D can include the first set(s) of data 226, the second set(s) of data 230, the third set(s) of data 240, the parameter(s) 228, information to be displayed via display device 400, and/or any other data and/or information described herein.

The computing device(s) 210 can also include a network interface 210E used to communicate, for example, with the other components of system 600 (e.g., via network 610). The network interface 210E can include any suitable components for interfacing with one or more network(s), including for example, transmitters, receivers, ports, controllers, antennas, and/or other suitable components.

Each of the first, second, and third data acquisition system(s) 202, 204, 206 can also include a network interface for communicating with one or more of the other component(s) of the system 600. Additionally, and/or alternatively, each of the first, second, and third data acquisition system(s) 202, 204, 206 can include one or more memory device(s) and/or separate databases which can store the data associated therewith.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A computer-implemented method of determining environmental impact on a mechanical component, comprising:
   receiving, by one or more computing devices, one or more first sets of data from one or more first data acquisition systems located on an aircraft and configured to communicate with an onboard system of the aircraft, wherein the first sets of data are indicative of one or more parameters associated with the aircraft wherein the parameters associated with the aircraft include one or more airport codes;
   receiving, by the one or more computing devices, one or more second sets of data from one or more second data acquisition systems that are remote from the aircraft, wherein the one or more second sets of data are indicative of an environmental condition in one or more locations associated with the aircraft including one or more environmental levels for one or more airports;
   receiving, by the one or more computing devices, one or more third sets of data indicative of at least one of a hardware design associated with the mechanical component, a flight plan associated with the aircraft, or a maintenance plan associated with the mechanical component from one or more third data acquisition systems that are remote from the aircraft and the one or more second data acquisition systems;
   determining, by the one or more computing devices, an aggregate amount of the environmental condition experienced by a mechanical component of the aircraft based at least in part on the received one or more first sets of data, the received one or more second sets of data, and the received one or more third sets of data; and
   performing, by the one or more computing devices, an operation associated with an aircraft fleet, that includes the aircraft, based on the determined aggregate amount of environmental condition.

2. The computer-implemented method of claim 1, wherein determining the aggregate amount of the environmental condition experienced by the mechanical component comprises:
   determining, by the one or more computing devices, the aggregate amount of the environmental condition experienced by the mechanical component based at least in part on a correlation between the one or more of the airport codes and the one or more of the environmental levels for one or more of the airports.

3. The computer-implemented method of claim 1, further comprising
   determining a level of distress associated with the mechanical component based at least in part on the aggregate amount of the environmental condition experienced by the mechanical component.

4. The computer-implemented method of claim 3, wherein determining the level of distress associated with the mechanical component comprises determining, by the one or more computing devices, a number of times the mechanical component exceeds a threshold level of the environmental condition.

5. The computer-implemented method of claim 3, wherein the level of distress associated with the mechanical component is indicative of an amount of ingested environmental condition for each flight over a life cycle of the mechanical component.

6. The computer-implemented method of claim 1, wherein the mechanical component is an engine of the aircraft and the onboard system of the aircraft is associated with the one or more sensors included with the engine of the aircraft, and wherein the one or more sensors are configured to measure at least a portion of the environmental condition experienced by the engine.

7. The computer-implemented method of claim 1, wherein the one or more locations associated with the aircraft comprise a first environment in which the aircraft has traveled, a second environment in which the aircraft will travel, or both, and wherein the one or more second data acquisition systems are associated with at least one of a satellite based system, an airport based system, or a publically available database.

8. The computer-implemented method of claim 1, wherein performing, by the one or more computing devices, the operation associated with an aircraft fleet that includes the aircraft comprises performing at least one of adjusting a schedule associated with the fleet, coordinating inspection or maintenance of the fleet, or ordering one or more replacement components for the fleet.

9. The computer-implemented method of claim 1, wherein the one or more computing devices are associated with a ground-based computing system, and wherein the one or more first data acquisition systems are located on the aircraft.

10. A system for determining environmental impact on a mechanical component, the system comprising one or more processors and one or more memory devices, the one or more memory devices storing instructions that when executed by the one or more processors cause the one or more processors to perform operations, the operations comprising:
    receiving one or more first sets of data from one or more first data acquisition systems located on an aircraft and configured to communicate with an onboard system of the aircraft, wherein the first sets of data are indicative of one or more parameters associated with the aircraft;
    receiving one or more second sets of data from one or more second data acquisition systems that are remote from the aircraft, wherein the one or more second sets of data are indicative of an environmental condition in one or more locations associated with the aircraft;
    receiving one or more third sets of data indicative of at least one of a hardware design associated with the mechanical component, a flight plan associated with the aircraft, or a maintenance plan associated with the mechanical component from one or more third data acquisition systems that are remote from the aircraft and the one or more second data acquisition systems;

determining a level of distress associated with the mechanical component based at least in part on the received one or more first sets of data, the received one or more second sets of data, and the received one or more third sets of data, including determining if the mechanical component exceeds a threshold level of an environmental condition and/or a number of times the mechanical component exceeds the threshold level of the environmental condition; and performing an operation associated with an aircraft fleet that includes the aircraft based on the determined level of distress associated with the mechanical component.

11. The system of claim 10, wherein the environmental condition comprises one or more of dust, pollution, volcanic ash, sulfates, sea salt, carbon black, organic particulate, smoke, and aerosols.

12. The system of claim 10, wherein the one or more locations are associated with one or more airports.

13. The system of claim 10, wherein the operations further comprise:

determining an aggregate amount of the environmental condition experienced by a mechanical component of the aircraft based at least in part on the received one or more first sets of data, the received one or more second sets of data, and the received one or more third sets of data, wherein determining the level of distress associated with the mechanical component comprises determining the level of distress associated with the mechanical component based at least in part on the aggregate amount of the environmental condition experienced by the mechanical component.

14. The system of claim 13, wherein the operations further comprise:

generating a unique identifier indicative of the aggregate amount of the environmental condition experienced by the mechanical component.

15. The system of claim 10, wherein the mechanical component is an engine, and wherein the level of distress associated with the mechanical component is indicative of an amount of ingested environment condition for each flight over a life cycle of the engine.

16. The system of claim 10, wherein the one or more third sets of data are indicative of at least one of a hardware design associated with the mechanical component, an operation plan associated with the mechanical component, and a maintenance plan associated with the mechanical component.

17. A system for managing a fleet of vehicles, the system comprising one or more processors and one or more memory devices, the one or more memory devices storing instructions that when executed by the one or more processors cause the one or more processors to perform operations, the operations comprising:

receiving one or more first sets of data from one or more first data acquisition systems located on a vehicle of a plurality of vehicles, wherein the first sets of data are indicative of one or more parameters associated with a mechanical component associated with the vehicle;

receiving one or more second sets of data from one or more second data acquisition systems that are remotely located from the vehicle, wherein the one or more second sets of data are indicative of the amount of environmental condition in one or more locations in which the vehicle has traveled;

determining a level of distress associated with the mechanical component based at least in part on the first sets of data and the second sets of data, including determining if the mechanical component exceeds a threshold level of an environmental condition and/or a number of times the mechanical component exceeds the threshold level of the environmental condition; and performing a predictive event associated with the mechanical component based at least in part on the level of distress associated with the mechanical component.

18. The system of claim 17, wherein performing the predictive event associated with the mechanical component based at least in part on the level of distress comprises:

predicting an amount of maintenance for one or more other components that are similar to the mechanical component.

19. The system of claim 17, wherein performing the predictive event associated with the mechanical component based at least in part on the one or more levels of distress comprises:

generating a recommendation indicating a hardware change associated with the mechanical component, an inspection of the mechanical component, or a repair of the mechanical component.

* * * * *